GEORGE WORKMAN'S
IMPROVED HARROW.
No. 98137  PATENTED DEC 21, 1869
FIG. I.
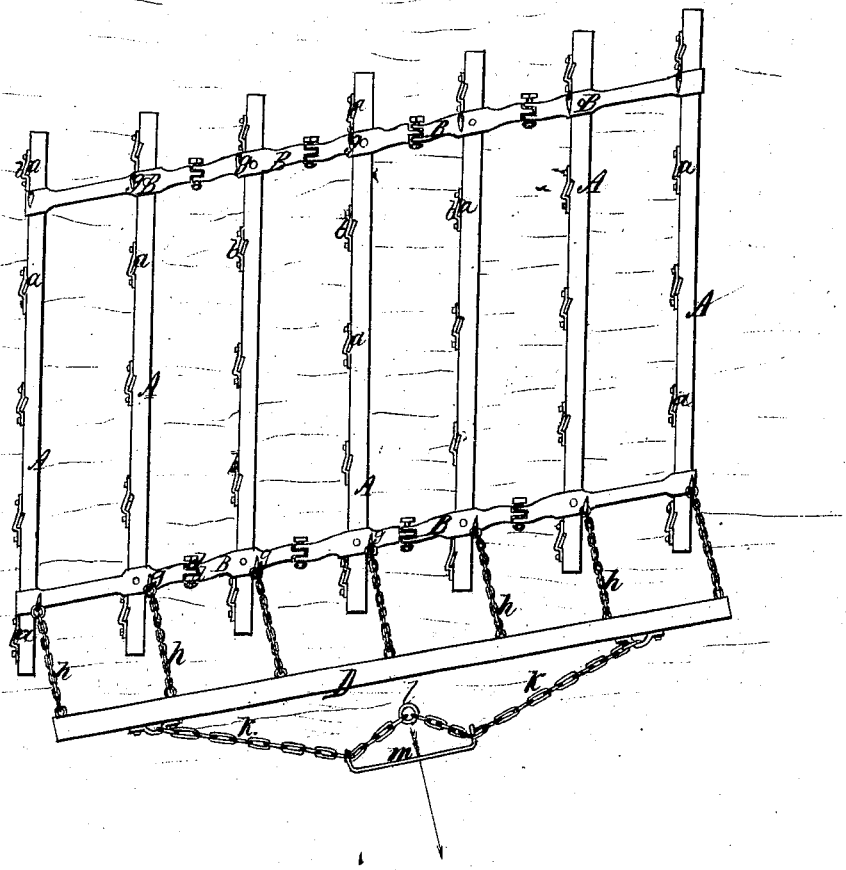
FIG. II.
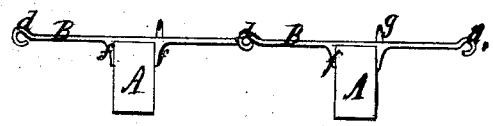
WITNESSES.
R. F. Osgood
Geo. W. Miatt
Inventor:
George Workman,
By J. Fraser & Co.,
Attys.

United States Patent Office.

GEORGE WORKMAN, OF ROCHESTER, NEW YORK.

Letters Patent No. 98,137, dated December 21, 1869.

IMPROVEMENT IN HARROWS.

The Schedule referred to in these Letters Patent and making part of the same.

*To all whom it may concern:*

Be it known that I, GEORGE WORKMAN, of the city of Rochester, county of Monroe, and State of New York, have invented a certain new and useful Improvement in Harrows; and I do hereby declare that the following is a full and exact description thereof, reference being had to the accompanying drawings, making part of this specification, in which—

Figure 1 is a plan of my improved harrow, and

Figure 2, an elevation, showing the connection of the strap-hinges with the bars.

Like letters of reference indicate corresponding parts in both figures.

My improvement is of that class known as jointed harrows, which are flexible and capable of being folded up in compact form.

The invention consists essentially in the construction of the strap-hinges, and the draught-bar and connections, the whole forming an arrangement by which the bars are easily connected, and the team may be attached at either end.

In the drawings—

A A indicate the bars, and

B B, the strap-hinges.

The bars are of ordinary form, and bear teeth, $a\ a$, which, however, instead of being set in sockets or mortises, cut in the bars, are set in sockets at the side of the same, formed by cutting angular notches in the sides, and fitting thereto iron caps, $b\ b$, which form the complete socket. Thus, the teeth stand angling to the direction of motion which is most effective in breaking up the soil. By thus applying the teeth, the bars are much stronger, and can be reduced in size, the teeth can be more expeditiously and easily inserted and removed, and they are much more effective in use.

The hinges B B are made in the form of straps, having hinge-joints $d\ d$, of any ordinary form, between the bars.

On the under side of these straps are formed right-angled lugs or flanges $f\ f$, which receive the bars A A between, and hold them in place; and on top is formed a series of hooks, $g\ g$, turning inward, as shown.

These hooks are provided at both ends of the harrow, and with them connects a series of chains $h\ h$, attached to a draught-bar, D.

On the opposite or outer side of the draught-bar, are attached slack chains $k\ k$, having a ring, $l$, at the centre, and also a straight connection-rod, $m$, at the same point, but attaching at each end to the chains back of the centre.

In ordinary work, the whiffletree may be connected with ring $l$; but when necessary, it can be attached to the rod $m$, by which means the harrow is allowed to play laterally either side of the centre, or out of line with the team. This is frequently desirable, for instance, in working on a hillside or around stones. This is one of the novel features of my invention.

The two outside bars A A, on each side of the harrow, are attached to a single strap-hinge, B, by which means the outside bars are steadied and prevented from turning.

The employment of the hooks $g\ g$, formed upon the hinges, allows the draught-bar D to be connected at either end of the harrow; and the attachment of the chains $h\ h$ to the hooks, in a series from one side to the other of the harrow, produces an equal draw upon all parts, without the sway and irregular action that occur where a single chain attaches to the centre, as in the old style.

The strap-hinges, with the flanges for the attachment of the wooden bars, and with the hooks, for the connection of the draught-chains, I believe to be a novelty.

What I claim as my invention, is—

The arrangement of the hinges B with flanges $f\ f$ and hooks $g\ g$, the draught-bar D with chains $h\ h$ and attachments $k\ k\ l\ m$, and the teeth-attachments $b\ b$, the whole operating in the manner and for the purpose specified.

In witness whereof, I have hereunto signed my name, in the presence of two subscribing witnesses.

GEORGE WORKMAN.

Witnesses:
J. A. DAVIS,
R. F. OSGOOD.